United States Patent
Umeda et al.

[11] Patent Number: 5,936,326
[45] Date of Patent: Aug. 10, 1999

[54] ALTERNATOR FOR VEHICLE

[75] Inventors: Atsushi Umeda, Okazaki; Tsutomu Shiga, Aichi-ken; Shin Kusase, Oobu, all of Japan

[73] Assignee: Denso Corporation, Kariya, Japan

[21] Appl. No.: 09/084,101

[22] Filed: May 26, 1998

[30] Foreign Application Priority Data

May 26, 1997 [WO] WIPO ................... PCT/JP97/01778
Sep. 22, 1997 [WO] WIPO ................... PCT/JP97/03374
Sep. 26, 1997 [JP] Japan ............................ 9-279751

[51] Int. Cl.[6] .............. H02K 3/32; H02K 1/22; H02K 3/04
[52] U.S. Cl. .................. 310/179; 310/180; 310/184; 310/201; 310/58
[58] Field of Search ................... 310/179, 180, 310/184, 201, 207, 215, 216, 257, 270, 263, 58, 60 R

[56] References Cited

U.S. PATENT DOCUMENTS

| | | | |
|---|---|---|---|
| 2,407,935 | 9/1946 | Pefetti et al. | 310/179 |
| 3,860,744 | 1/1975 | Schuler | 310/201 |
| 4,425,519 | 1/1984 | Balke et al. | 310/45 |
| 4,908,541 | 3/1990 | Kawazoe et al. | 310/270 |
| 5,097,167 | 3/1992 | Kanayama et al. | 310/201 |
| 5,552,651 | 9/1996 | Radomski | 310/181 |

FOREIGN PATENT DOCUMENTS

| | | |
|---|---|---|
| 55-141947 | 11/1980 | Japan . |
| 57-132743 | 8/1982 | Japan . |
| 59-127546 | 7/1984 | Japan . |
| 62-272836 | 11/1987 | Japan . |
| 63-59744 | 3/1988 | Japan . |
| 64-5340 | 1/1989 | Japan . |
| 1-27406 | 8/1989 | Japan . |
| 3027748 | 2/1991 | Japan . |
| 4-24939 | 4/1992 | Japan . |
| 5-308736 | 11/1993 | Japan . |
| 5-308737 | 11/1993 | Japan . |
| 6-46550 | 2/1994 | Japan . |
| 7-194060 | 7/1995 | Japan . |
| 149526 | 9/1931 | Switzerland . |
| 23548 | of 1912 | United Kingdom . |
| 863073 | 3/1961 | United Kingdom . |
| WO 92/06527 | 4/1992 | WIPO . |

*Primary Examiner*—Thomas M. Dougherty
*Assistant Examiner*—Burton S. Mullins
*Attorney, Agent, or Firm*—Pillsbury Madison & Sutro LLP

[57] ABSTRACT

It is an object of this invention to provide an alternator for a vehicle in which all electric conductors forming bridge portions are sufficiently exposed to cooling winds so that the cooling performance is remarkably improved. It is another object of this invention to provide an alternator for a vehicle which is excellent in cooling performance, insulating characteristic, and heat resisting property. An alternator for a vehicle includes a stator. The stator includes an iron core 22, an electric conductor 21, and an insulator 23. The electric conductor 21 forms a winding on the iron core 22. The insulator 23 provides electric insulation between the electric conductor 21 and the iron core 22. The stator is supported by a housing. The dimension of openings of slots in the iron core 22 is smaller than the distance between inner side surfaces of the slots. The electric conductor 21 has accommodated portions accommodated in the slots, and bridge portions connecting the accommodated portions. Pieces of the electric conductor which extend out of the slots are approximately separated into a conductor groups 21f located on outer radial sides of the slots and a conductor group 21g located on inner radial sides of the slots, and form the bridge portions. Predetermined gaps are provided between pieces of the electric conductor in the bridge portions. The bridge portions have ridge portions inclined in a same circumferential direction in each of the outer radial side and the inner radial side, and top portions connecting the ridge portions along an axial and radial direction.

14 Claims, 12 Drawing Sheets

ALTERNATOR FOR VEHICLE

BACKGROUND OF THE INVENTION

1. Field of the Invention

This invention relates to an alternator for a vehicle such as a passenger automotive vehicle or a truck.

2. Description of the Related Art

There have been various proposals to provide small-size high-power alternators for vehicles.

Japanese published unexamined patent application 6-46550 discloses a way of improving the power generation performance which uses a permanent magnet.

To meet demands for downsizing, it is necessary to use a small-size cooling fan in an alternator. The rate of air flow generated by the small-size cooling fan is relatively low. On the other hand, a high-power alternator generates an increased rate of heat. Thus, a high-power alternator with a small-size cooling fan tends to have the problem of a temperature rise.

Accordingly, to provide a small-size high-power alternator, it is necessary to remove the problems caused by a temperature rise. Especially, it is necessary to implement effective heat radiation from electric conductors in a power generating stator under small size restrictions.

Japanese published unexamined patent application 7-194060 discloses that water having a high heat radiation efficiency is used as coolant for an alternator. The alternator in Japanese application 7-194060 needs pipings for the cooling water, and a water jacket in the alternator body. Accordingly, the alternator in Japanese application 7-194060 tends to be heavy and large in size. Thus, the alternator in Japanese application 7-194060 does not meet demands for downsizing.

General prior-art air-cooling techniques include a step of decreasing the temperature of coil end portions of electric conductors in a stator. The coil end portions are also referred to as the bridge portions.

Japanese published examined patent application 4-24939, Japanese published unexamined patent application 63-59744, Japanese published examined utility model application 1-27406, and Japanese published unexamined patent application 57-132743 disclose improvements of bridge portions.

According to these prior-art air-cooling techniques, pieces of an electric conductor which form bridge portions are arranged so that cooling air can efficiently flow therebetween and improved heat radiation can be attained. In the prior-art air-cooling techniques, bridge portions of electrical conductive wires are partially spaced from each other, and are in a flat and regular arrangement as a whole. In the prior-art air-cooling techniques, the bridge portions interfere with paths for the flow of cooling air, and hence offer great resistances to the flow of cooling air. An impregnation agent for fixing the bridge portions covers the surfaces thereof, and provides an increased resistance to the cooling air. Accordingly, the prior-art air-cooling techniques have a poor cooling performance.

In a general prior-art structure, an electric conductor in a stator is coated with an insulating film, and an impregnation agent for fixing the electric conductor is applied onto the insulating film. It is well-known that the insulating film considerably deteriorates the heat radiation from the electric conductor. Since sufficient insulation is necessary, it is impractical to remove or thin the insulating film.

In a prior-art structure, the heat resisting property (the allowable temperature) of electric conductors coated with insulating layers is determined by the heat-deterioration temperature of the insulating layers in a region where the electric conductors overlap each other. Thus, it is difficult to improve the heat resisting property (the allowable temperature).

SUMMARY OF THE INVENTION

This invention has been carried out in view of the above-mentioned problems.

It is an object of this invention to provide an alternator for a vehicle in which all electric conductors forming bridge portions are sufficiently exposed to flowing cooling air so that the cooling performance is remarkably improved.

It is another object of this invention to provide an alternator for a vehicle which has an excellent cooling performance, insulating performance, and heat resisting property.

In order to attain the above-mentioned objects, this invention is designed as follows.

According to this invention, pieces of an electric conductor in bridge portions are spaced from each other, and insulating layers in the bridge portions are thinner than insulating layers in accommodated portions placed in slots.

According to this invention, electric insulating members are provided between the accommodated portions of the electric conductor and a core, and provide electric insulation between the accommodated portions of the electric conductor and the core. On the other hand, pieces of the electric conductor in the bridge portions are spaced from each other to provide electric insulation between the pieces of the electric conductor in the bridge portions.

According to this invention, the bridge portions of the electric conductor are smaller in cross-sectional area than the accommodated portions of the electric conductor.

According to this invention, the bridge portions of the electric conductor are spaced from each other by a distance of 0.5 mm or more, and are electrically insulated from each other.

According to this invention, a cooling fan is disposed at least at one axial end of the rotor opposing the stator.

According to this invention, the bridge portions of the electric conductor have first portions and second portions, the first portions extending and inclining in circumferential directions, the second portions extending in radial directions. In addition, axial-direction positions of the second portions are in an axial-direction range where the cooling fan is present.

In this invention, $R'>r\geq R>r'$ for at least one side of the stator and the rotor, where R denotes a radial-direction inside diameter of the bridge portions of the electric conductor, and R' denotes an inside diameter of the iron core, and r denotes a pole core outside diameter of the rotor, and r' denotes an outside diameter of the cooling fan.

According to this invention, the electric conductor comprises a plurality of approximately U-shaped segments having straight portions inserted into the slots, and one side surface of the iron core is formed by turn portions of the U-shaped segments. In addition, the straight portions are uniformly arrayed and accommodated in the slots.

According to this invention, the insulating layers comprise insulating cover films on the electric conductor, and fixed insulating films formed by an impregnation process, and the bridge portions have only the insulating cover films or the fixed insulating films.

According to this invention, the insulating layers are absent from the electric conductor in the bridge portions.

Thus, the electric conductor is naked metallic members at the bridge portions.

In this invention, pieces of the electric conductor in the bridge portions are spaced from each other, and the insulating layers in the bridge portions are thin. Therefore, the heat radiation from the surfaces of the electric conductor is remarkably improved, and a rise in the temperature of the electric conductor can be effectively suppressed. Thus, the heat deterioration of the insulating layer is suppressed. Since the pieces of the electric conductor in the bridge portions are spaced from each other, it is possible to improve both the heat resisting property (the allowable temperature) and the insulating performance related to the electric conductor.

In this invention, electric insulating members are provided between the accommodated portions of the electric conductor and the core of said stator, and provide electric insulation between the accommodated portions of the electric conductor and the core. On the other hand, pieces of the electric conductor in the bridge portions are spaced from each other to prevent the pieces of the electric conductor in the bridge portions from interfering with each other and also to provide electric insulation between the pieces of the electric conductor in the bridge portions.

In this invention, the insulating performance related to the accommodated portions is remarkably improved. In addition, it is possible to sufficiently withstand mechanical stress during the insertion of the electric conductor. Although the insulating layers on the bridge portions are thin, it is possible to provide sufficient electric insulation.

In this invention, the bridge portions of the electric conductor are smaller in cross-sectional area than the accommodated portions of the electric conductor. To implement the spaced bridge portions, the bridge portions are made smaller in cross-sectional area than the accommodated portions. Pieces of the electric conductor in the bridge portions are spaced from each other by gaps corresponding to the cross-sectional area difference.

Thus, the pieces of the electric conductor in the bridge potions can be spaced from each other without making the envelope dimensions (the axial-direction dimension and the radial-direction dimension) of the bridge portions greater than those in a prior-art structure. Thus, it is possible to provide a small-size high-power alternator for a vehicle.

In this invention, the bridge portions of the electric conductor are spaced from each other by a distance of 0.5 mm or more. In this case, the electric insulation is practically sufficient, and effective heat radiation is available.

In this invention, a cooling fan is provided on at least one of two ends of the rotor in an axial direction. A flow of cooling air which is generated by the cooling fan meets the bridge portions of the electric conductor. Therefore, it is possible to effectively suppress a rise in the temperature of the electric conductor.

In this invention, the bridge portions of the electric conductor have first portions and second portions, the first portions extending and inclining in circumferential directions, the second portions extending in radial directions. Cooling air flow generated by the cooling fan is directed from the central axis toward a radially outward area. Therefore, the bridge portions of the electric conductor which extend in radial directions are efficiently exposed to the cooling air. Thus, the bridge portions which extend in the radial directions serve as efficient cooling fins (efficient heat radiation fins). The bridge portions forming the cooling fins are located in an axial-direction range where the cooling fan is present, and thereby the cooling air generated by the cooling fan will surely meet the cooling fins.

The above-mentioned improvements on the electric conductor on the stator enable this invention in which the outside diameter r' of the cooling fan is smaller than the pole core outside diameter r of the rotor. Thus, the cooling fan has a smaller diameter. Therefore, the fan noise can be reduced, and the cooling fan is subjected to a reduced centrifugal force. The cooling fan can be made of a thin and inexpensive member. Since the outside diameter r' of the cooling fan can be smaller, the radial-direction inside diameter R of the bridge portions can also be smaller. As a result, the radial-direction outside diameter of the bridge portions can be decreased. Thus, it is possible to reduce the outside diameter of the frame (the housing) which supports the stator and the rotor. Accordingly, the miniaturization of the alternator for the vehicle can be implemented.

In this invention, the electric conductor includes a plurality of approximately U-shaped segments. Thus, it is easy to process the electric conductor into a desired shape. The U-shaped segments can easily be inserted into the slots in the stator while the bridge portions are separated from each other. Thus, it is possible to remarkably reduce manufacture costs.

In this invention, the insulating layers are thin. Thus, it is possible to further improve the heat radiation from the surfaces of the electric conductor. Accordingly, it is possible to effectively suppress a rise in the temperature of the electric conductor.

In this invention, the electric conductor in the bridge portions is exposed to the flow of cooling air. Thus, it is possible to further improve the heat radiation from the surfaces of the electric conductor. Accordingly, it is possible to effectively suppress a rise in the temperature of the electric conductor.

DESCRIPTION OF THE PREFERRED EMBODIMENTS

First Embodiment

Figure 1:
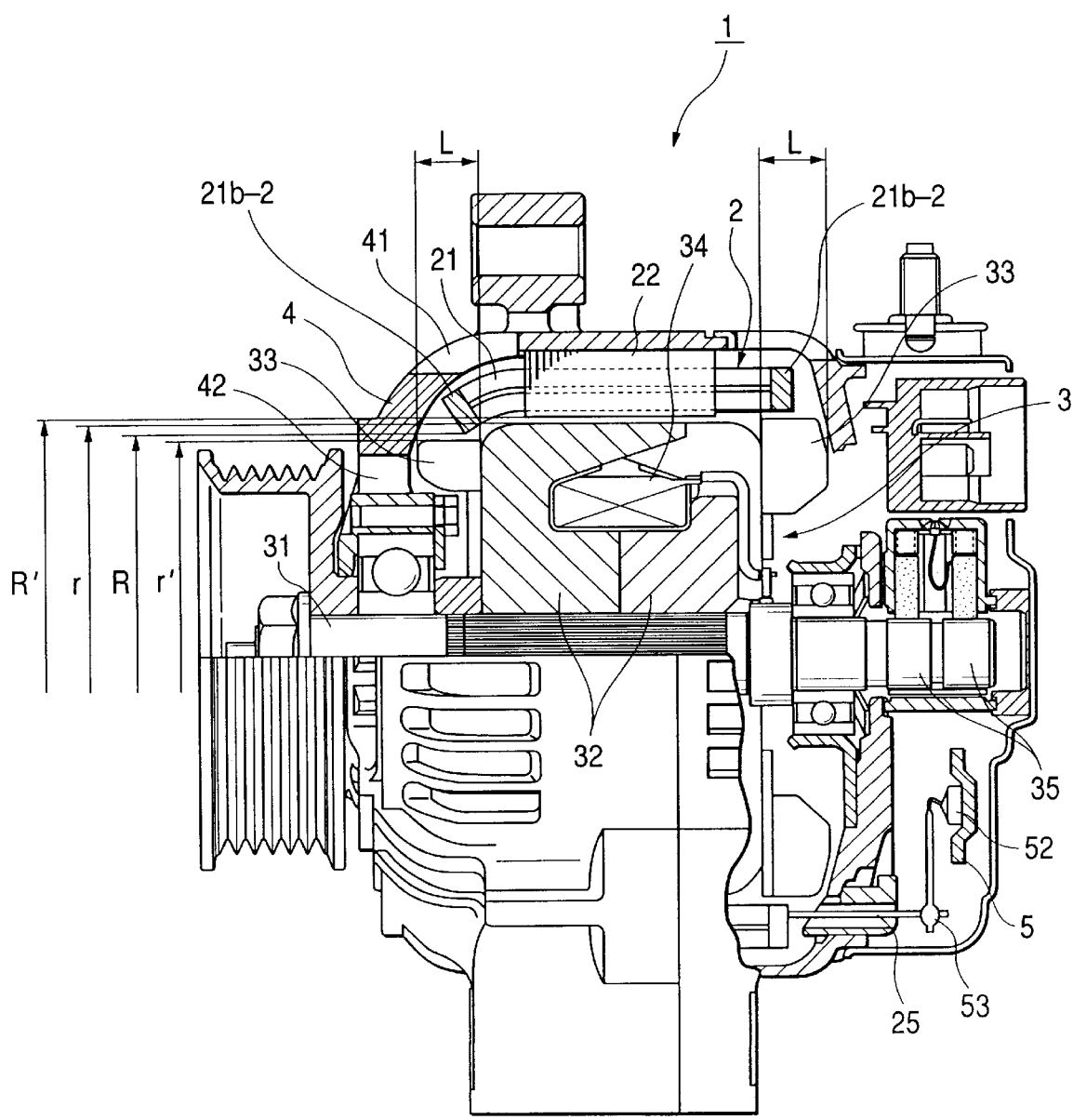
FIG. 1 is a sectional view of an alternator for a vehicle according to a first embodiment of this invention.

With reference to FIGS. 1 to 5, an alternator 1 for an automotive vehicle according to a first embodiment of this invention includes a stator 2, a rotor 3, a housing 4, and a rectifier 5. The stator 2 serves as an armature. The rotor 3 generates a magnetic field. The housing 4 supports the stator 2 and the rotor 3. The housing 4 is also referred to as the frame 4. The rectifier 5 is directly connected to the stator 2. The rectifier 5 converts alternating current power into direct current power.

The rotor 3 rotates together with a shaft 31. The rotor 3 includes a pair of Lundel-type pole cores 32, cooling fans 33, a field coil 34, and slip rings 35.

The shaft 31 is connected to a pulley, being rotated and driven by an engine (not shown) mounted on the automotive vehicle for powering the same.

The housing 4 has outlets 41 for cooling air which extend in areas opposing electric-conductor bridge portions 21b of the stator 2. The housing 41 has end faces in an axial direction which are formed with inlets 42 for cooling air.

The stator 2 includes an electric conductor 21, an iron core 22, and an insulator 23. The electric conductor 21 forms a winding on the iron core 22. The insulator 23 provides electric insulation between the electric conductor 21 and the iron core 22. The stator 2 is supported by the housing 4. The iron core 22 is of the multiple-layer type in which thin steel plates are laminated. The iron core 22 has inner circumferential surfaces formed with a plurality of slots 24. Side surfaces of the slots 24 are approximately parallel to each other. The dimension of the open ends of the slots 24 is smaller than the distance between the side surfaces thereof.

The electric conductor 21 has accommodated portions 21a and bridge portions 21b. The accommodated portions 21a are placed in the slots 24. The bridge portions 21b connect the accommodated portions 21a. Segments of the electric conductor 21 which extend from the slots 24 are approximately separated into a conductor group 21f located on outer radial sides of the slots 24 and a conductor group 21g located on inner radial sides of the slots 24. The conductor groups 21f and 21g compose the bridge portions 21b. Adjacent conductor pieces in the bridge portions 21b are spaced from each other by a predetermined gap or a predetermined clearance. Each of the bridge portions 21b has two ridge portions 21b-1, and a top portion 21b-2 connecting the ridge portions 21b-1 along an axial and radial direction. The ridge portions 21b-1 are inclined in a same circumferential direction in each of the outer radial side and the inner radial side.

Figure 2:
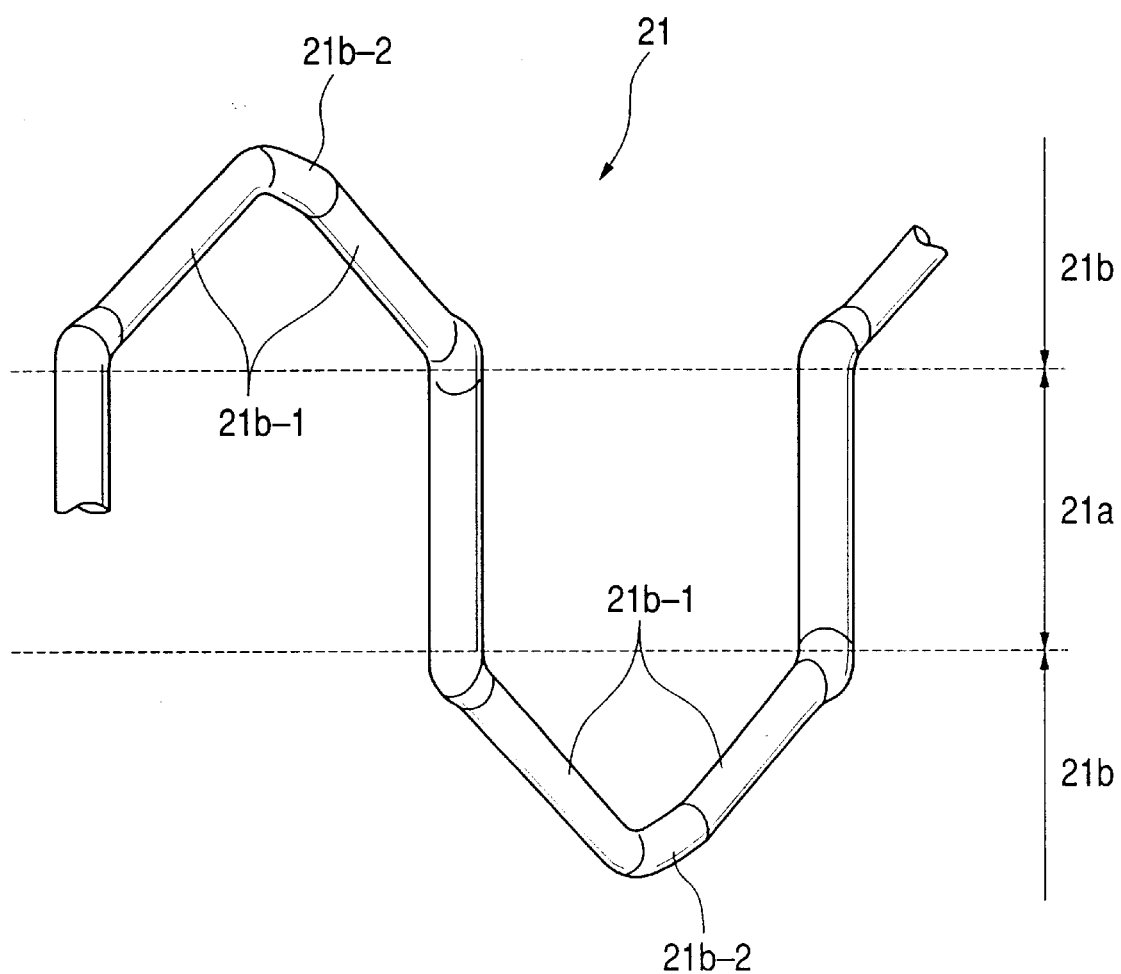
FIG. 2 is a perspective view of an electric conductor on a stator in the alternator of the first embodiment of this invention.

As shown in FIG. 2, conductor pieces in the bridge portions 21b are thinner than the accommodated portions 21a. In other words, the conductor pieces in the bridge portions 21b are smaller in cross section than the accommodated portions 21a.

In the embodiment of this invention, the electric conductor 21 can be formed by drawing parts of a circular-cross-section wire coated with an insulating film, and thereby providing variations in the wire diameter.

Figure 3:
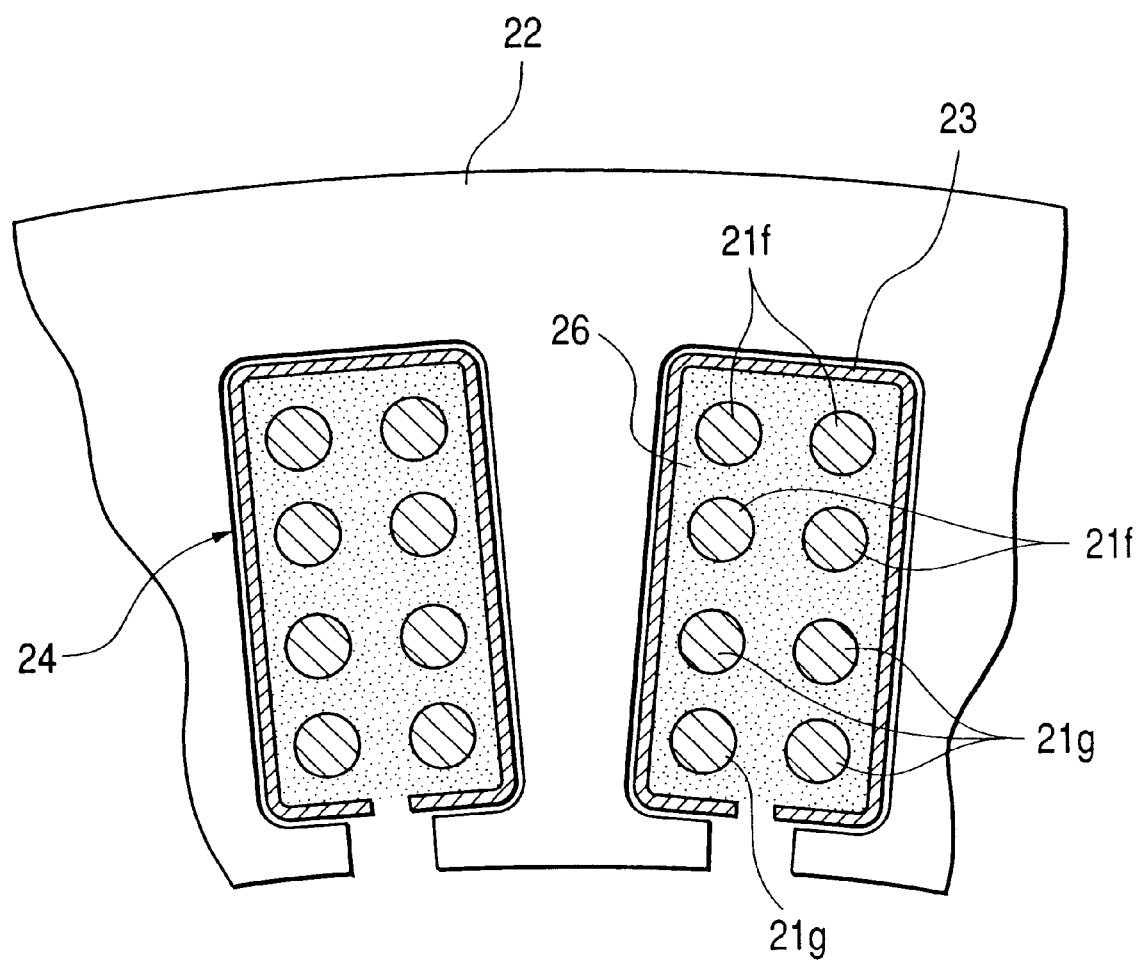
FIG. 3 is a sectional view of the stator in the alternator of the first embodiment of this invention.
Figure 4:
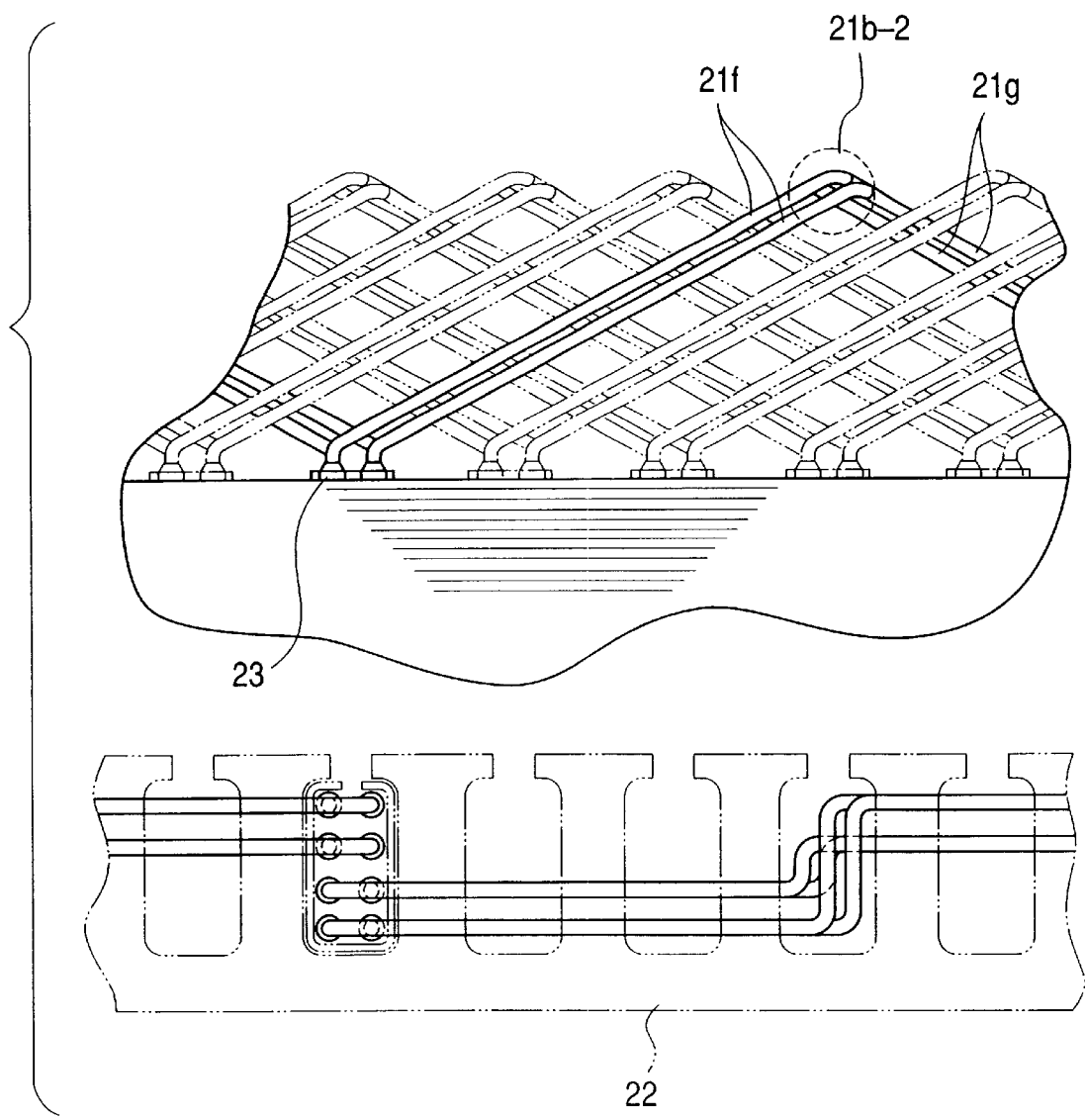
FIG. 4 are views of the stator in the alternator of the first embodiment of this invention.

The insulator 23 has a shape such as shown in FIG. 3. In the embodiment of this invention, the insulator 23 uses a high heatproof film made of material containing, for example, mica.

The portions of the electric conductor which are accommodated in the slots 24 are subjected to an impregnation process to more firmly fix the positional relations among the iron core 22, the insulator 23, and the pieces of the electric conductor 21. Thus, the pieces of the electric conductor 21 in the slots 24 are surrounded by an impregnation agent 26. The impregnation agent 26 forms a part of an insulating layer covering the electric conductor 21 in the slots 24. Accordingly, the thickness of the insulating layers on the accommodated portions in the slots 24 is greater than the thickness of the insulating layers on the bridge portions by a value corresponding to the impregnation agent 26.

The stator winding has three phases provided with phase ends 25. Regarding each of the three phases, a first end thereof is extended along an axial direction, and is electrically connected to an electrode 53 of a rectifying diode 53 in the rectifier 5. Second ends of the three phases are connected as a neutral point.

An explanation will be given of the advantages provided by the embodiment of this invention. According to the embodiment of this invention, in the bridge portions of the electric conductor, the direction of the inclination of the ridge portions in the conductor group located in the outer radial side can be equal to the direction of the inclination of the ridge portions in the conductor group located in the inner radial side. Thus, it is possible to prevent the conductor group in the outer radial side and the conductor group in the inner radial side from overlapping and interfering with each other. As shown in FIG. 2, pieces of the electric conductor in the bride portions 21b are thinner than the accommodated portions 21a of the electric conductor. Therefore, it is easy to provide predetermined gaps between adjacent pieces of the electric conductor for electric insulation. Even in the case where such predetermined gaps are actually provided, there is the advantage that the envelope dimensions (the axial-direction dimension and the radial-direction dimension) as a whole of the bridge portions of the electric conductor can be equal to or smaller than those in a prior-art structure.

Figure 5:
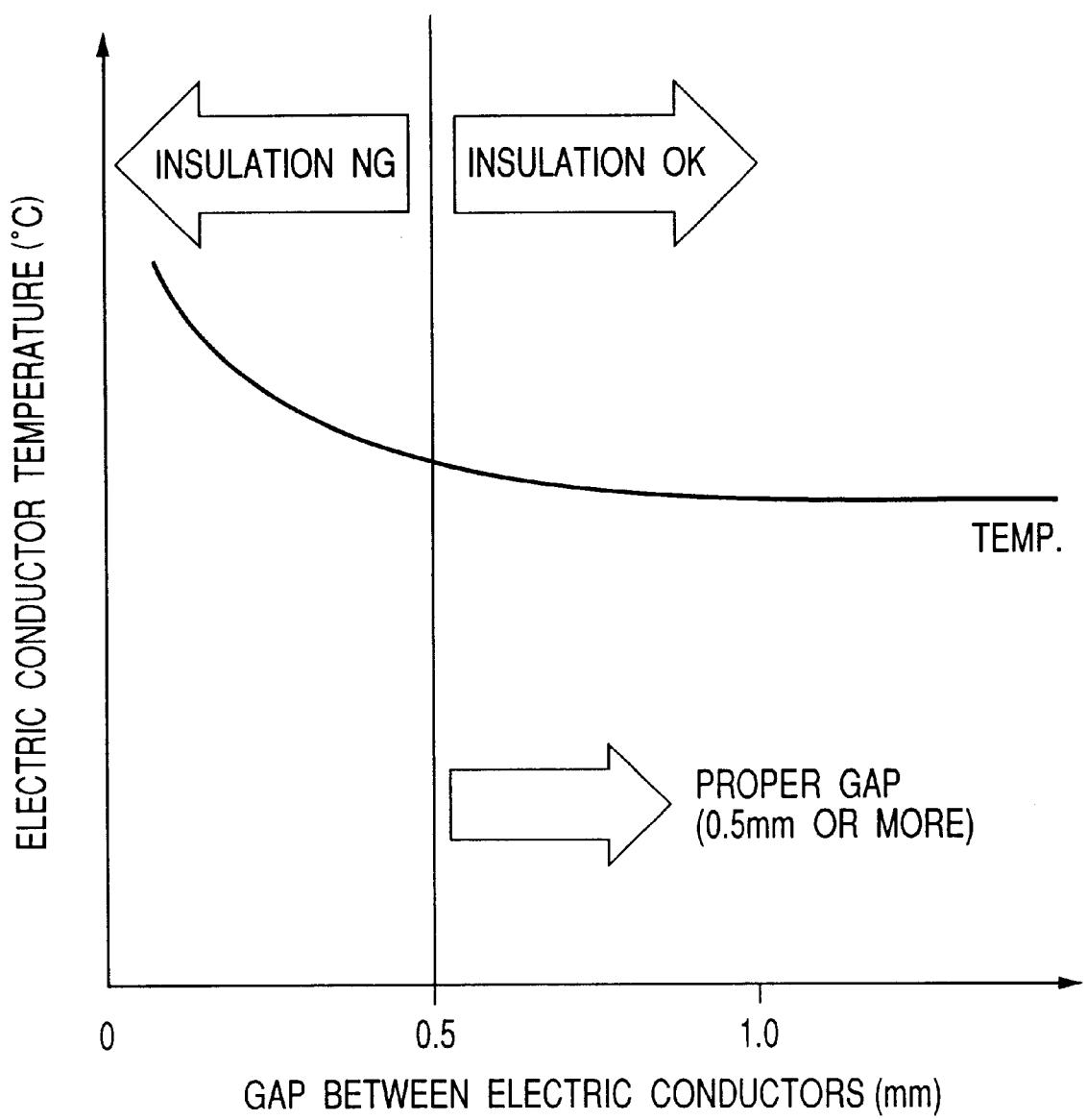
FIG. 5 is a diagram showing the relation among the temperature of an electric conductor, the magnitude of the gaps between pieces of the electric conductor, and the degree of insulation.
Figure 6:
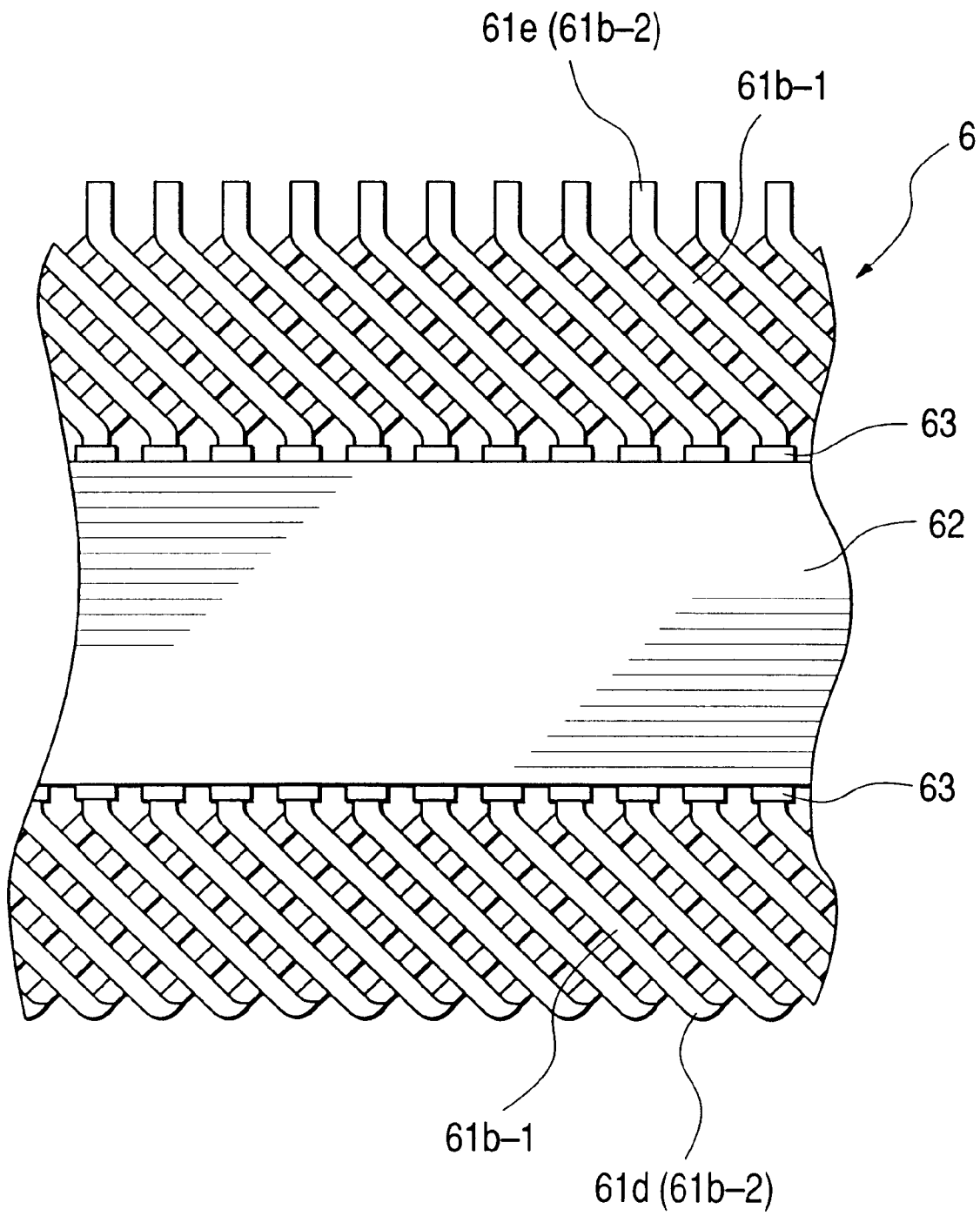
FIG. 6 is a diagrammatic view of a stator in an alternator for a vehicle according to a second embodiment of this invention.

In the embodiment of this invention, the gap (the spacing) between the pieces of the electric conductor in the bridge portions is set to, for example, about 0.5 mm. FIG. 5 shows the relation among the temperature of the electric conductor, the magnitude of the gaps between the pieces of the electric conductor, and the degree of the insulation which is obtained by various experimental tests. It is shown in FIG. 5 that gaps of 0.5 mm or more suffice for insulation and cooling. On the other hand, gaps of less than 0.5 mm cause increased resistance to the cooling air flowing through the regions between the pieces of the electric conductor, thus resulting in an inadequate cooling performance. In the case of gaps of less than 0.5 mm, the affections of a variation in the temperature of the electric conductor and a vibration caused by the engine make it difficult to provide sufficient insulation. Thus, it is preferable to set the gaps to about 0.5 mm.

In the embodiment of this invention, the insulating layer covering the electric conductor 21 is thin enough so that the heat radiation from the electric conductor 21 is improved. Pieces of the electric conductor 21 in the accommodated portions 21a are sufficiently electrically insulated from the iron core 22 of the stator 2 by the insulator 23. Pieces of the electric conductor 21 in the bridge portions 21b are prevented from interfering with each other. The pieces of the electric conductor 21 in the bridge portions 21b are spaced from each other, and are hence electrically insulated from each other.

Since the insulating layer covering the electric conductor 21 is thin, the heat radiation from the surfaces of the bridge portions of the electric conductor 21 is remarkably improved. Thus, it is possible to effectively suppress a rise in the temperature of the electric conductor 21 in the stator 2.

Therefore, the heat deterioration of the insulating layers is suppressed. Since the pieces of the electric conductor 21 in the bridge portions are spaced from each other, it is possible to improve the heat resisting property (the allowable temperature) of the electric conductor 21 and the insulating performance.

In the embodiment of this invention, the insulating layers are made of the high heatproof material. Accordingly, the heat resisting property (the allowable temperature) of the stator 2 is remarkably improved.

In the embodiment of this invention, the cooling fans 33 are provided on the ends of the rotor 3 in the axial direction. The cooling fans 33 are of the built-in type or the inner type. The housing 4 has the outlets 41 which extend in the areas opposing the electric-conductor bridge portions 21b. Accordingly, cooling air flows from the central axis toward the outlets 41 of the housing 4 through the gaps between the electric-conductor bridge portions 21b along the radially outward directions. Since the pieces of the electric conductor 21 in the bridge portions 21b are spaced from each other, the surfaces of the pieces of the electric conductor 21 are surely exposed to the cooling air. Thus, it is possible to improve the cooling performance. The cooling air enables a sound wave to be repetitively reflected and absorbed in the regions around the pieces of the electric conductor 21. Accordingly, noise sound is remarkably reduced.

The tops of the electric-conductor bridge portions 21b have shapes extending along the directions of flows of the cooling air. The cooling fans 33 are in axial positional agreement with the tops of the electric-conductor bridge portions 21b. Accordingly, the tops of the electric-conductor bridge portions 21b serve as effective heat radiation fins. Thus, it is possible to further improve the cooling performance.

As previously explained, the embodiment of this invention makes it possible to remarkably improve the cooling performance related to the electric conductor 21. Since the pieces of the electric conductor 21 in the bridge portions 21b are spaced from each other, resistance to the cooling air can be greatly decreased. Thus, it is possible to miniaturize the cooling fans 33 or to decrease the diameter of the cooling fans 33. The small-size fans 33 generate reduced fan noise. The small-size fans 33 are subjected to decreased centrifugal forces. The small-size fans 33 can be made of a thin and inexpensive member. In accordance with a reduction in the size of the cooling fans 33, the outside diameter of the electric-conductor bridge portions 21b can be decreased. Thus, it is possible to reduce the outside diameter of the frame (the housing) 4 which supports the stator 2 and the rotor 3. Accordingly, the miniaturization of the alternator 1 for the vehicle can be implemented.

Second Embodiment

FIGS. 6 to 9 show a stator 6 in an alternator for an automotive vehicle according to a second embodiment of this invention. The stator 6 includes electric conductor segments 61, an iron core 62, and an insulator 63. The electric conductor segments 61 compose a winding on the iron core 62. The insulator 63 provides electric insulation between the electric conductor segments 61 and the iron core 62.

The winding is composed of the electric conductor segments 61 which are electrically connected. The winding includes turn portions 61d and connected portions 61e. The turn portions 61d are located on one side of the iron core 62 in an axial direction. The connected portions 61e are located on the other side of the iron core 62 in the axial direction.

The electric conductor segments 61 have accommodated portions 61a and bridge portions 61b. The accommodated portions 61a are placed in slots 64 in the iron core 62. The bridge portions 61b connect the accommodated portions 61a. Adjacent bridge portions 61b are spaced from each other by a predetermined gap or a predetermined clearance which can provide electric insulation.

The bridge portions 61b have ridge portions 61b-1 and top portions 61b-2. The ridge portions 61b-1 are inclined in a same circumferential direction in outer layers and inner layers. The top portions 61b-2 connect the ridge portions 61b-1 in an axial and radial direction. The top portions 61b-2 form the turn portions 61d and the connected portions 61e.

Figure 7:
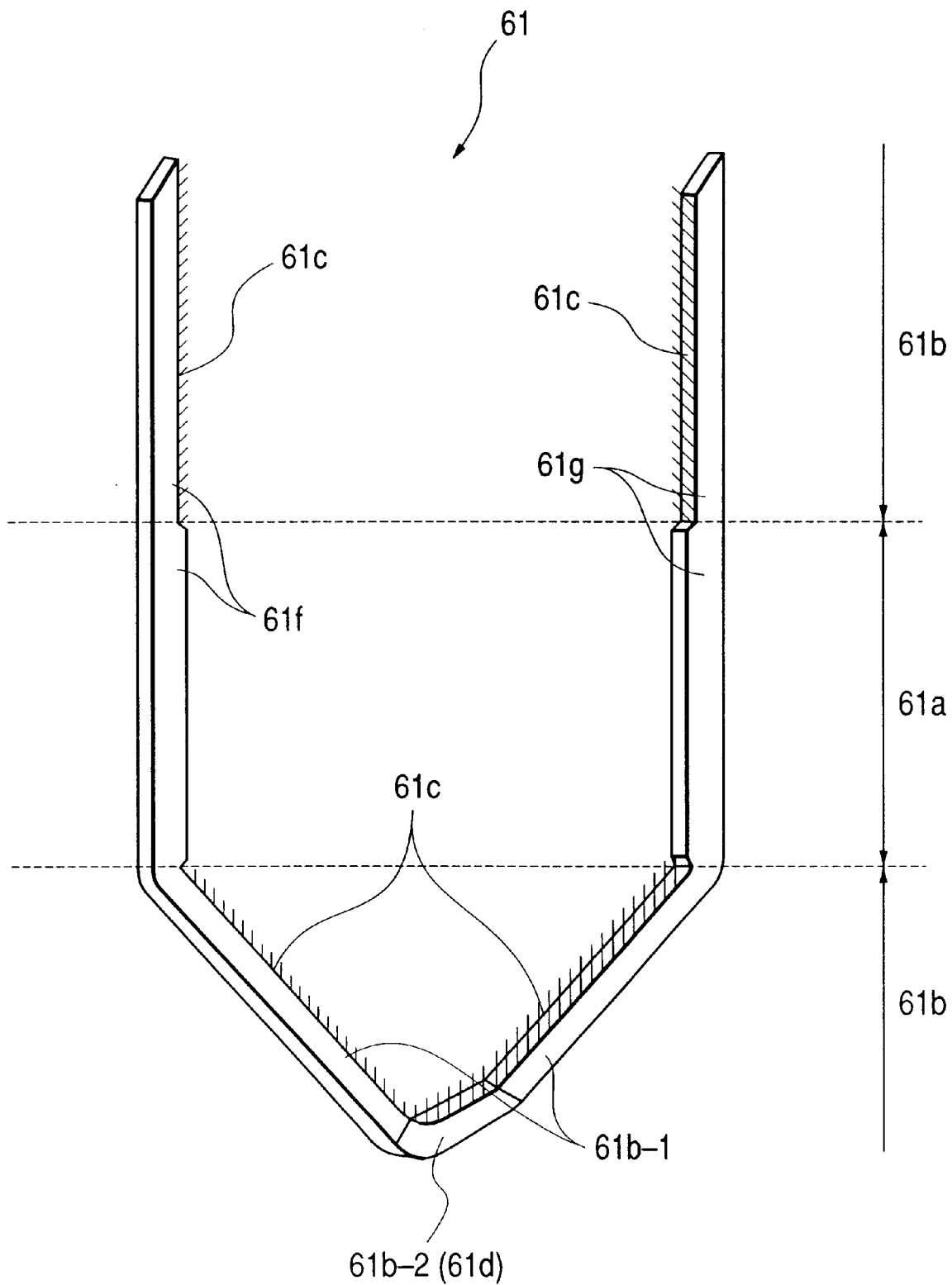
FIG. 7 is a perspective view of an electric conductor segment used in a winding on a stator in the alternator of the second embodiment of this invention.

As shown in FIG. 7, the bridge portion 61b of each electric conductor segment 61 has stepped portions 61c. Thus, the cross-sectional area of each bridge portion 61b is smaller than that of each accommodated portion 61a.

Each of the electric conductor segments 61 is made of a bare metal member. Each of the electric conductor segments 61 may be made of a metal member coated with an insulating film. Generally, the electric conductor segments 61 are formed by, for example, a pressing process. Thus, it is possible to reduce a material cost and a processing cost.

Figure 8:
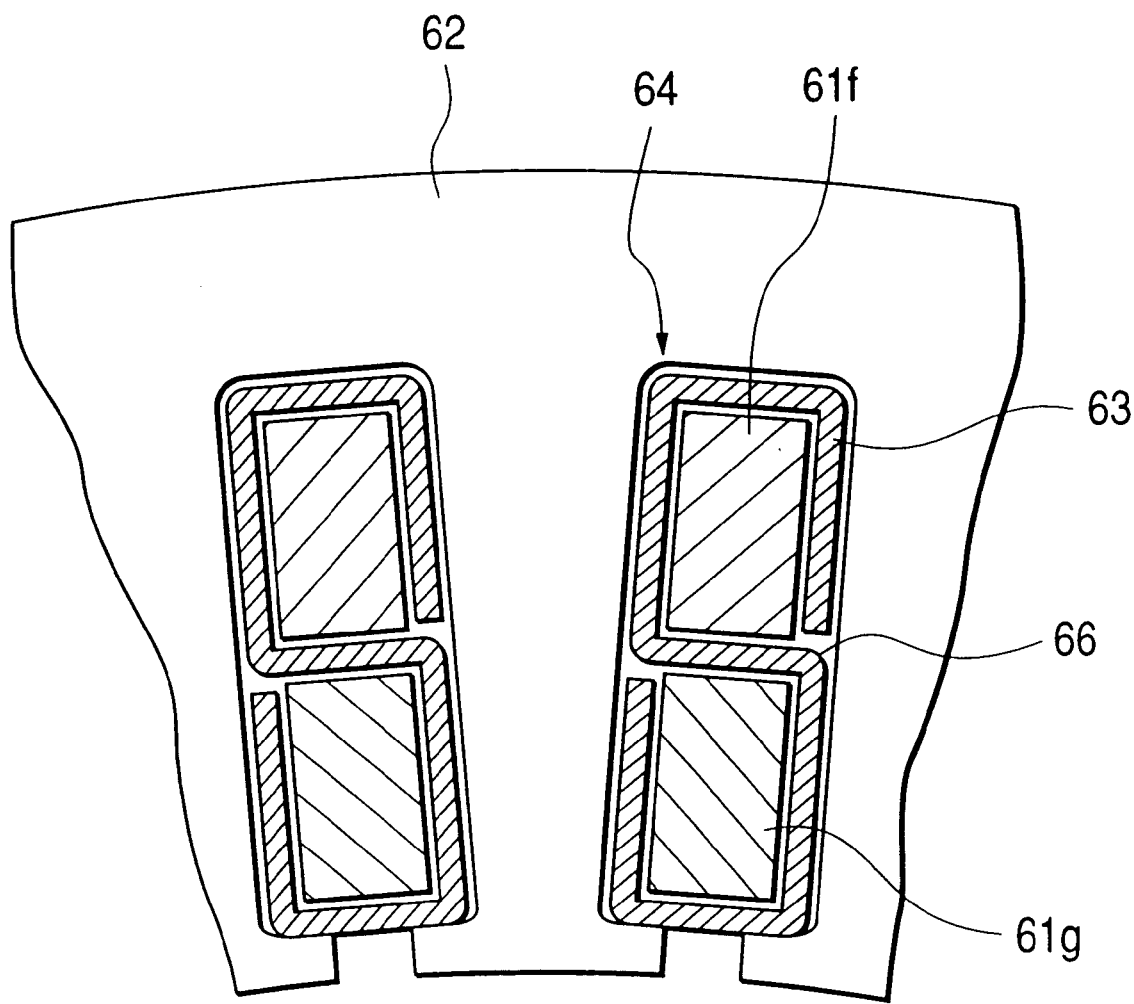
FIG. 8 is a sectional view of the stator in the alternator of the second embodiment of this invention.
Figure 9:
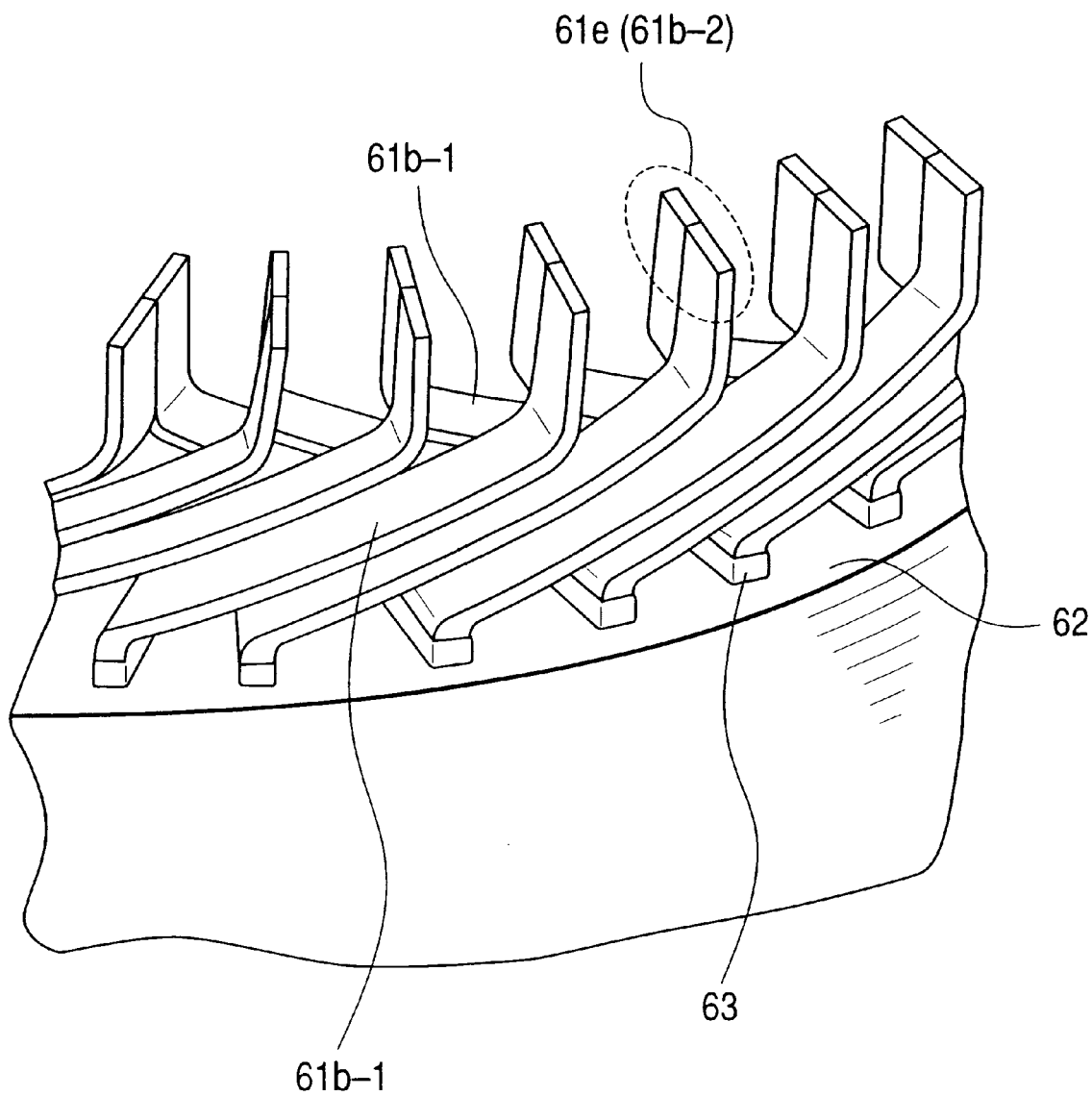
FIG. 9 is a perspective view of the stator in the alternator of the second embodiment of this invention.

As shown in FIG. 8, the insulator 63 has an approximately S shape in order to provide insulation between the electric conductor segments 61 and the iron core 62, and insulation between the electric conductor segments 61 in each of the slots 64 in the iron core 62. In the embodiment of this invention, the insulator 63 uses a high heatproof film made of material containing, for example, mica.

The portions of the electric conductor which are accommodated in the slots 64 are subjected to an impregnation process to more firmly fix the positional relations among the iron core 62, the insulator 63, and the electric conductor segments 61. Thus, the electric conductor segments 61 in the slots 64 are surrounded by an impregnation agent 66. The impregnation agent 66 forms a part of an insulating layer covering each of the electric conductor segments 61 in the slots 64. Accordingly, the thickness of the insulating layers on the accommodated portions 61a in the slots 64 is greater than the thickness of the insulating layers on the bridge portions 61b by a value corresponding to the impregnation agent 66.

The winding on the stator 6 is formed as follows. U-shaped electrically-conductive segments 61 are prepared which have approximately equal shapes. As shown in FIG. 7, each of the U-shaped segments 61 has an outer-layer-side conductor portion 61f, an inner-layer-side conductor portion 61g, and a conductor turn portion 61d. The U-shaped segments 61 are arranged with respect to the iron core 62 so that the turn portions 61d will align with each other on one side of the iron core 62 in the axial direction. The U-shaped segments 61 are inserted into the slots 64 in a manner such that the outer-layer-side conductor portions 61f are located in outer areas of the slots 64 while the inner-layer-side conductor portions 61g are located in inner areas of the slots 64. For example, each of the U-shaped segments 61 is formed by bending a copper plate and pressing it into an approximately U shape. The U-shaped segments 61 are pressed into the slots 64 so that the outer radial side surfaces and the inner radial side surfaces of the accommodated portions 61a will engage the side surfaces of the slots 64 via the insulators 63.

Then, the ends of the outer-layer-side conductor portions 61f remote from the turn portions 61d are bent toward a first circumferential direction while the ends of the inner-layer-side conductor portions 61g are bent toward a second circumferential direction opposite to the first circumferential direction. Subsequently, the ends of the U-shaped segments 61 are connected so that the electric conductor segments 61 in each common phase will be electrically connected together.

An explanation will be given of the advantages provided by the embodiment of this invention. According to the embodiment of this invention, in the bridge portions of the electric conductor, the direction of the inclination of the ridge portions located in the inner layer side can be equal to the direction of the inclination of the ridge portions located in the outer layer side. Thus, in each of the inner layer side and the outer layer side, it is possible to prevent the ridge portions from interfering with each other.

As shown in FIG. 7, the electric-conductor bridge portions have the stepped portions 61c. Thus, sufficient gaps can be provided and the ridge portions of the electric conductor can be prevented from interfering each other even in regions where the inner-layer-side and outer-layer-side ridge portions are inclined and are adjacent to each other as crosses while the envelope dimensions (the axial-direction dimension and the radial-direction dimension) of the bridge portions of the electric conductor are prevented from becoming greater than those in a prior-art structure.

In the embodiment of this invention, the windings on the stator 6 do not use any insulating film covering the electric conductor which would deteriorate the heat radiation from the electric conductor. Although the electric conductor segments 61 are made of the bare metal members, the insulator 63 provides sufficient electric insulation with respect to the accommodated portions 61a. The bridge portions 61b are spaced from each other so that they can be prevented from interfering with each other, and that sufficient electric insulation can be provided therebetween.

In the embodiment of this invention, the electric conductor uses the approximately U-shaped segments. Thus, it is easy to provide the electric conductor with the stepped portions 61c. In addition, it is easy to process the electric conductor into a desired shape. The bridge portions can be made separate from each other without using any special jig. Thus, it is possible to remarkably reduce manufacture costs.

Third Embodiment

Figure 10:
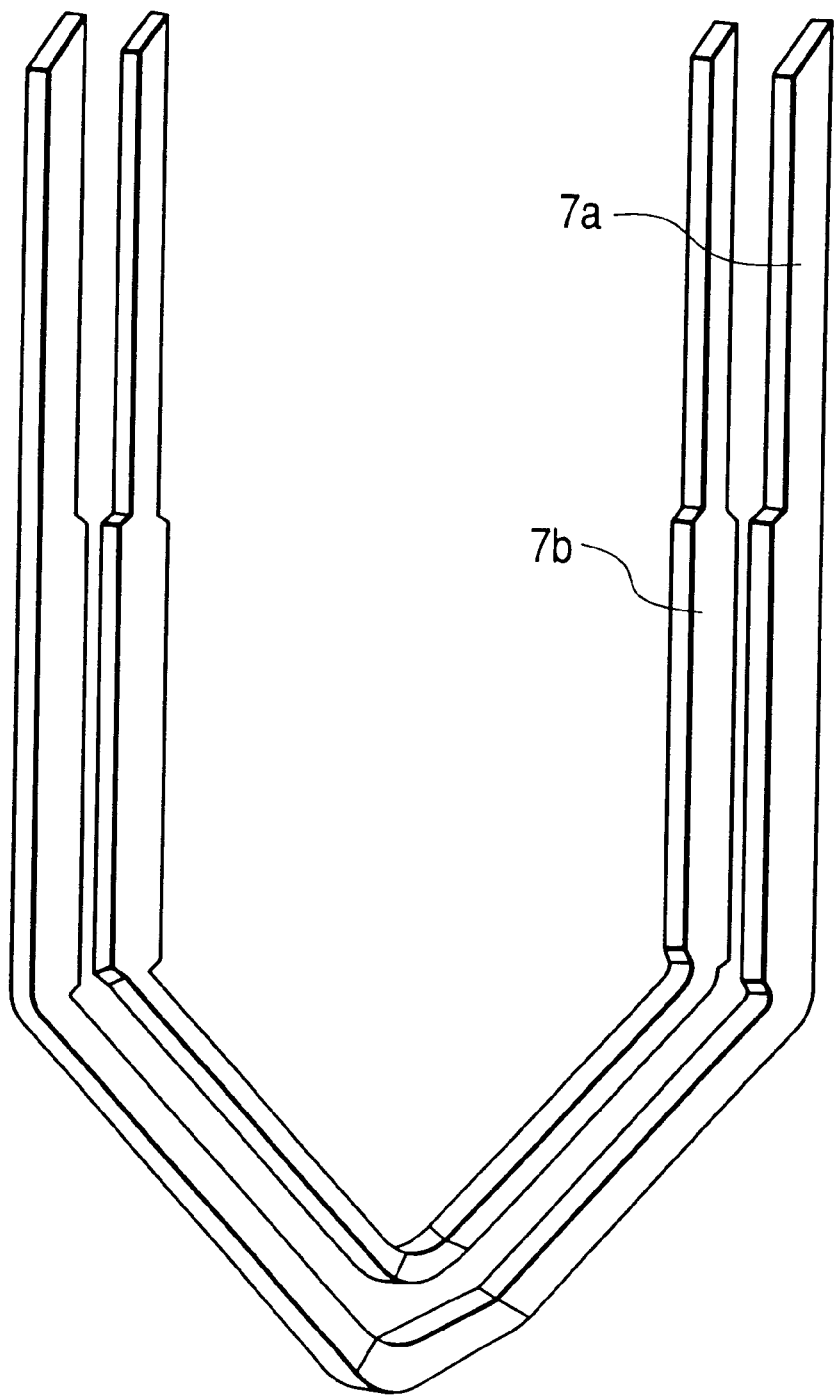
FIG. 10 is a perspective view of electric conductor segments used in a winding on a stator in an alternator for a vehicle according to a third embodiment of this invention.
Figure 11:
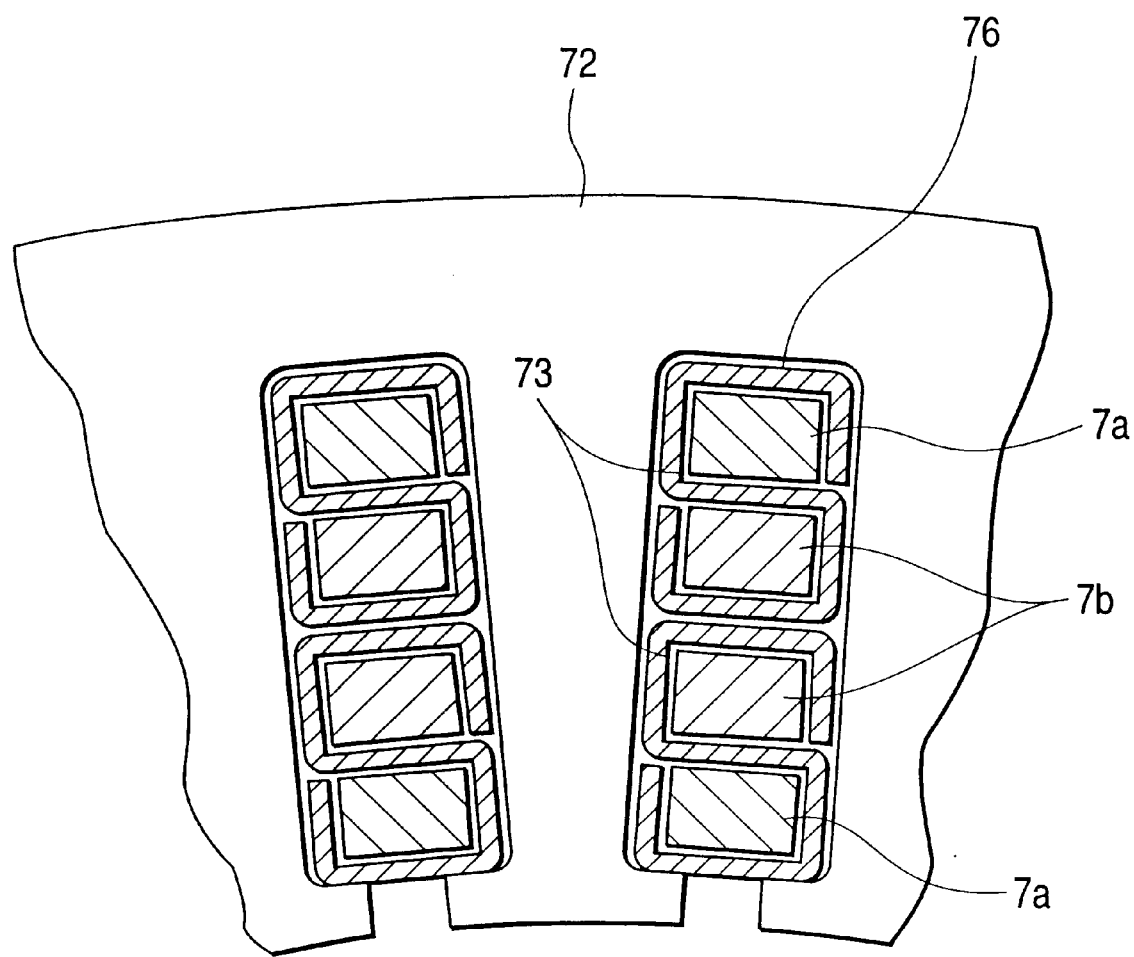
FIG. 11 is a sectional view of the stator in the alternator of the third embodiment of this invention.
Figure 12:
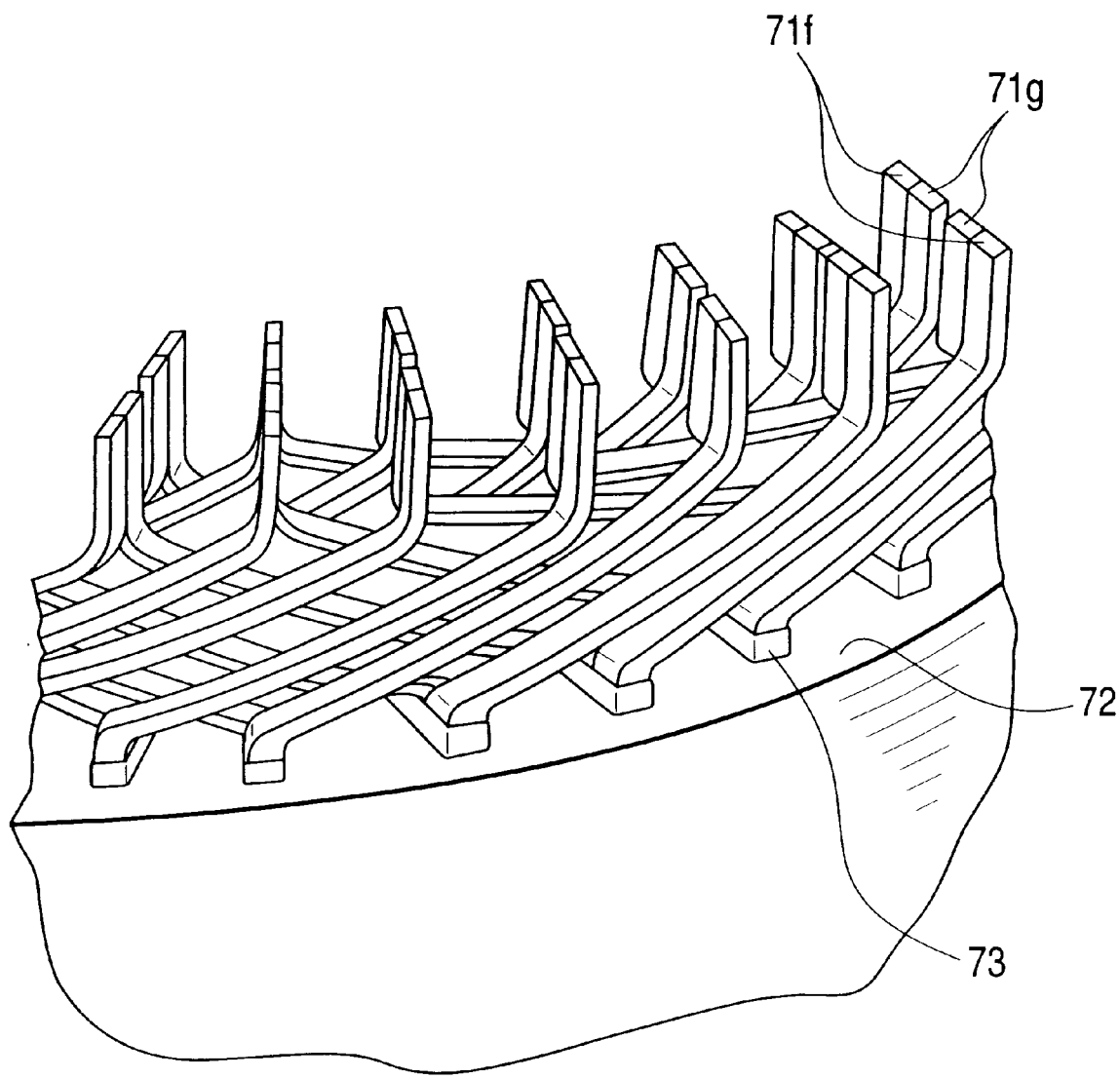
FIG. 12 is a perspective view of the stator in the alternator of the third embodiment of this invention.

FIGS. 10 to 12 show a third embodiment of this invention. While two electric conductor segments are inserted into one slot in the stator in the second embodiment of this invention, four electric conductor segments are inserted into one slot in a stator in the third embodiment of this invention. The third embodiment of this invention is similar in basic structure to the second embodiment thereof.

In the third embodiment of this invention, electric conductor segments 7a and 7b approximately correspond to possible halves of the electric conductor segment 61 in FIG. 7, respectively. The electric conductor segments 7a and 7b are electrically insulated from each other as follows.

A U-shaped member is halved into electric conductor segments 7a and 7b. The electric conductor segment 7a is located outward of the electric conductor segment 7b. The outer-side electric conductor segment 7a has stepped portions similar in shape to the stepped portions in the electric conductor segment 61 of FIG. 7. The inner-side electric conductor segment 7b is provided with stepped portions at two sides of a bridge portion. The stepped portions in the electric conductor segments 7b are designed to provide sufficient insulating gaps in regions where the bridge portions are inclined and are adjacent to each other as crosses after the electric conductor segments 7a and 7b are inserted into slots in the stator.

As shown in FIG. 11, two approximately S-shaped insulators 73 are arranged in each slot in the stator. The two insulators 73 provide insulation in the slot. The portions of the electric conductor which are accommodated in the slots are subjected to an impregnation process to more firmly fix the positional relations among an iron core 72, the insulators 73, and the electric conductor segments 7a and 7b. Thus, the electric conductor segments 7a and 7b in the slots are surrounded by an impregnation agent 76.

Other Embodiments

While the electric conductor pieces in each slot in the stator are separated into the two electric conductor groups corresponding to the inner radial side and the outer radial side respectively in the first embodiment of this invention, more electric conductor groups may be formed.

As previously explained, two electric conductor segments are inserted into one slot in the stator in the second embodiment of this invention. Four electric conductor segments are inserted into one slot in a stator in the third embodiment of this invention. The third embodiment of this invention provides advantages similar to those provided by the second embodiment thereof. More electric conductor segments may be inserted into one slot in a stator.

After the impregnation process, insulating material may be applied to the bridge portions of the electric conductor to form insulating films covering the bare metal wires in the bridge portions.

What is claimed is:

1. An alternator for a vehicle, comprising:
   a Lundel-type field rotor with N and S poles formed alternately in a circumferential direction;
   a stator disposed around said rotor so as to confront an outer periphery of said rotor;
   a frame supporting said rotor and said stator; and
   a cooling fan disposed at least at one axial end of said rotor opposing said stator;
   wherein said stator comprises a laminated core with a plurality of slots and electric conductors accommodated in said slots;
   said electric conductors comprising accommodated portions and bridge portions, said accommodated portions being accommodated in said slots, said bridge portions connecting said accommodated portions,
   wherein pieces of said electric conductors in the bridge portions are spaced from each other, said bridge portions having insulating layers, said accommodated portions having insulating layers,
   wherein said insulating layers in said bridge portions are thinner than the insulating layers in said accommodated portions, and
   wherein said bridge portions of said electric conductors are spaced from each other, and said bridge portions of said electric conductors are smaller in cross-sectional area than said accommodated portions of said electric conductors to enhance cooling of said electric conductors.

2. An alternator according to claim 1, wherein said accommodated portions of said electric conductors are insulated from each other by an electrical insulating material interposed between abutting surfaces of said electric conductors and between each of said electric conductors and the core of said stator, while said electric conductors are spaced from each other for providing electrical insulation at said bridge portions.

3. An alternator according to claim 2, wherein said bridge portions of said electric conductors are spaced from each other by a distance of 0.5 mm or more, and are electrically insulated from each other.

4. An alternator according to claim 3, wherein said bridge portions of said electric conductors have first portions and second portions, said first portions extending and inclining in circumferential directions, said second portions extending in radial directions, and the second portions are located radially across from said cooling fan.

5. An alternator according to claim 2, wherein said bridge portions of said electric conductors have first portions and second portions, said first portions extending and inclining in circumferential directions, said second portions extending in radial directions, and the second portions are located radially across from said cooling fan.

6. An alternator according to claim 5, wherein said electric conductors comprise a plurality of approximately U-shaped segments having straight portions inserted into said slots, and said U-shaped segments have turn portions positioned at one side of said laminated core of said stator, and wherein the straight portions are uniformly arrayed and accommodated in said slots so that the straight portions form at least a part of said accommodated portions.

7. An alternator according to claim 2, wherein said electric conductors comprise a plurality of approximately U-shaped segments having straight portions inserted into said slots, and said U-shaped segments have turn portions positioned at one side of said laminated core of said stator, and wherein the straight portions are uniformly arrayed and accommodated in said slots so that the straight portions form at least a part of said accommodated portions.

8. An alternator according to claim 1, wherein said bridge portions of said electric conductors are spaced from each other by a distance of 0.5 mm or more, and are electrically insulated from each other.

9. An alternator for a vehicle, comprising:
a Lundel-type field rotor with N and S poles formed alternately in a circumferential direction;
a stator disposed around said rotor so as to confront an outer periphery of said rotor; and
a frame supporting said rotor and said stator;
wherein said stator comprises a laminated core with a plurality of slots and electric conductors accommodated in said slots;
said electric conductors comprising accommodated portions and bridge portions, said accommodated portions being accommodated in said slots, said bridge portions connecting said accommodated portions,
wherein pieces of said electric conductors in the bridge portions are spaced from each other, said bridge portions having insulating layers, said accommodated portions having insulating layers,
wherein said insulating layers in said bridge portions are thinner than the insulating layers in said accommodated portions,
wherein said accommodated portions of said electric conductors are insulated from each other by an electrical insulating material interposed between abutting surfaces of said electric conductors and between each of said electric conductors and the core of said stator, while said electric conductors are spaced from each other for providing electrical insulation at said bridge portions, and
wherein $R'>r \geq R>r'$ for at least one side of said stator and said rotor, and R denotes a radial-direction inside diameter of said bridge portions of said electric conductors, and R' denotes an inside diameter of said laminated core of said stator, and r denotes a pole core outside diameter of said rotor, and r' denotes an outside diameter of the cooling fan.

10. An alternator for a vehicle, comprising:
a Lundel-type field rotor with N and S poles formed alternately in a circumferential direction;
a stator disposed around said rotor so as to confront an outer periphery of said rotor; and
a frame supporting said rotor and said stator;
wherein said stator comprises a laminated core with a plurality of slots and electric conductors accommodated in said slots;
said electric conductors comprising accommodated portions and bridge portions, said accommodated portions being accommodated in said slots, said bridge portions connecting said accommodated portions,
wherein pieces of said electric conductors in the bridge portions are spaced from each other, said bridge portions having insulating layers, said accommodated portions having insulating layers,
wherein said insulating layers in said bridge portions are thinner than the insulating layers in said accommodated portions,
wherein said accommodated portions of said electric conductors are insulated from each other by an electrical insulating material interposed between abutting surfaces of said electric conductors and between each of said electric conductors and the core of said stator, while said electric conductors are spaced from each other for providing electrical insulation at said bridge portions,
wherein said bridge portions of said electric conductors are spaced from each other, and said bridge portions of said electric conductors are smaller in cross-sectional area than said accommodated portions of said electric conductor,
wherein a cooling fan is disposed at least at one axial end of said rotor opposing said stator, and
wherein $R'>r \geq R>r'$ for at least one side of said stator and said rotor, and R denotes a radial-direction inside diameter of said bridge portions of said electric conductors, and R' denotes an inside diameter of said laminated core of said stator, and r denotes a pole core outside diameter of said rotor, and r' denotes an outside diameter of the cooling fan.

11. An alternator for a vehicle, comprising:
a Lundel-type field rotor with N and S poles formed alternately in a circumferential direction;
a stator disposed around said rotor so as to confront an outer periphery of said rotor; and
a frame supporting said rotor and said stator;
wherein said stator comprises a laminated core with a plurality of slots and electric conductors accommodated in said slots;
said electric conductors comprising accommodated portions and bridge portions, said accommodated portions being accommodated in said slots, said bridge portions connecting said accommodated portions, wherein pieces of said electric conductors in the bridge portions are spaced from each other, said bridge portions having insulating layers, said accommodated portions having insulating layers, wherein said insulating layers in said bridge portions are thinner than the insulating layers in said accommodated portions, wherein said accommodated portions of said electric conductors are insulated from each other by an electrical insulating material interposed between abutting surfaces of said electric conductors and between each of said electric conductors and the core of said stator, while said electric conductors are spaced from each other for providing electrical insulation at said bridge portions, wherein said bridge portions of said electric conductors are spaced from each other by a distance of 0.5 mm or more, and are electrically insulated from each other, wherein a cooling fan is disposed at least at one axial end of said rotor opposing said stator, and wherein R'>r≧R>r' for at least one side of said stator and said rotor, and R denotes a radial-direction inside diameter of said bridge portions of said electric conductors, and R' denotes an inside diameter of said laminated core of said stator, and r denotes a pole core outside diameter of said rotor, and r' denotes an outside diameter of the cooling fan.

12. An alternator for a vehicle, comprising:

a Lundel-type field rotor with N and S poles formed alternately in a circumferential direction;

a stator disposed around said rotor so as to confront an outer periphery of said rotor; and a frame supporting said rotor and said stator;

wherein said stator comprises a laminated core with a plurality of slots and electric conductors accommodated in said slots;

said electric conductors comprising accommodated portions and bridge portions, said accommodated portions being accommodated in said slots, said bridge portions connecting said accommodated portions, wherein pieces of said electric conductors in the bridge portions are spaced from each other, said bridge portions having insulating layers, said accommodated portions having insulating layers, wherein said insulating layers in said bridge portions are thinner than the insulating layers in said accommodated portions, wherein said accommodated portions of said electric conductors are insulated from each other by an electrical insulating material interposed between abutting surfaces of said electric conductors and between each of said electric conductors and the core of said stator, while said electric conductors are spaced from each other for providing electrical insulation at said bridge portions, and wherein R'>r≧R>r' for at least one side of said stator and said rotor, and R denotes a radial-direction inside diameter of said bridge portions of said electric conductors, and R' denotes an inside diameter of said laminated core of said stator, and r denotes a pole core outside diameter of said rotor, and r' denotes an outside diameter of the cooling fan.

13. An alternator for a vehicle, comprising:

a Lundel-type field rotor with N and S poles formed alternately in a circumferential direction;

a stator disposed around said rotor so as to confront an outer periphery of said rotor; and a frame supporting said rotor and said stator;

wherein said stator comprises a laminated core with a plurality of slots and electric conductors accommodated in said slots;

said electric conductors comprising accommodated portions and bridge portions, said accommodated portions being accommodated in said slots, said bridge portions connecting said accommodated portions, wherein pieces of said electric conductors in the bridge portions are spaced from each other, said bridge portions having insulating layers, said accommodated portions having insulating layers, wherein said insulating layers in said bridge portions are thinner than the insulating layers in said accommodated portions, wherein said accommodated portions of said electric conductors are insulated from each other by an electrical insulating material interposed between abutting surfaces of said electric conductors and between each of said electric conductors and the core of said stator, while said electric conductors are spaced from each other for providing electrical insulation at said bridge portions, wherein said bridge portions of said electric conductors are spaced from each other, and said bridge portions of said electric conductor are smaller in cross-sectional area than said accommodated portions of said electric conductors, wherein a cooling fan is disposed at least at one axial end of said rotor opposing said stator, wherein said bridge portions of said electric conductors have first portions and second portions, said first portions extending and inclining in circumferential directions, said second portions extending in radial directions, and the second portions are located radially across from said cooling fan, and wherein R'>r≧R>r' for at least one side of said stator and said rotor, and R denotes a radial-direction inside diameter of said bridge portions of said electric conductors, and R' denotes an inside diameter of said laminated core of said stator, and r denotes a pole core outside diameter of said rotor, and r' denotes an outside diameter of the cooling fan.

14. An alternator for a vehicle, comprising:

a Lundel-type field rotor with N and S poles formed alternately in a circumferential direction;

a stator disposed around said rotor so as to confront an outer perinphery of said rotor; and a frame supporting said rotor and said stator;

wherein said stator comprises a laminated core with a plurality of slots and electric conductors accommodated in said slots;

said electric conductors comprising accommodated portions and bridge portions, said accommodated portions being accommodated in said slots, said bridge portions connecting said accommodated portions, wherein pieces of said electric conductors in the bridge portions are spaced from each other, said bridge portions having insulating layers, said accommodated portions having insulating layers, wherein said insulating layers in said bridge portions are thinner than the insulating layers in said accommodated portions, wherein said accommodated portions of said electric conductors are insulated from each other by an electrical insulating material interposed between abutting surfaces of said electric conductors and between each of said electric conductors and the core of said stator, while said electric conductors are spaced from each other for providing electrical insulation at said bridge portions, wherein said bridge portions of said electric conductors are spaced from each other by a distance of 0.5 mm or more, and are electrically insulated from each other, wherein a cooling fan is disposed at least at one axial end of said rotor opposing said stator, wherein said bridge portions of said electric conductors have first portions and second portions, said first portions extending and inclining in circumferential directions, said second portions extending in radial directions, and the second portions are located radially across from said cooling fan, and wherein $R'>r\geq R>r'$ for at least one side of said stator and said rotor, and R denotes a radial-direction inside diameter of said bridge portions of said electric conductors, and R' denotes an inside diameter of said laminated core of said stator, and r denotes a pole core outside diameter of said rotor, and r' denotes an outside diameter of the cooling fan.

* * * * *